May 16, 1939.　　　M. WATTER　　　2,158,598
AIRCRAFT CONSTRUCTION
Filed Nov. 30, 1937　　2 Sheets-Sheet 1
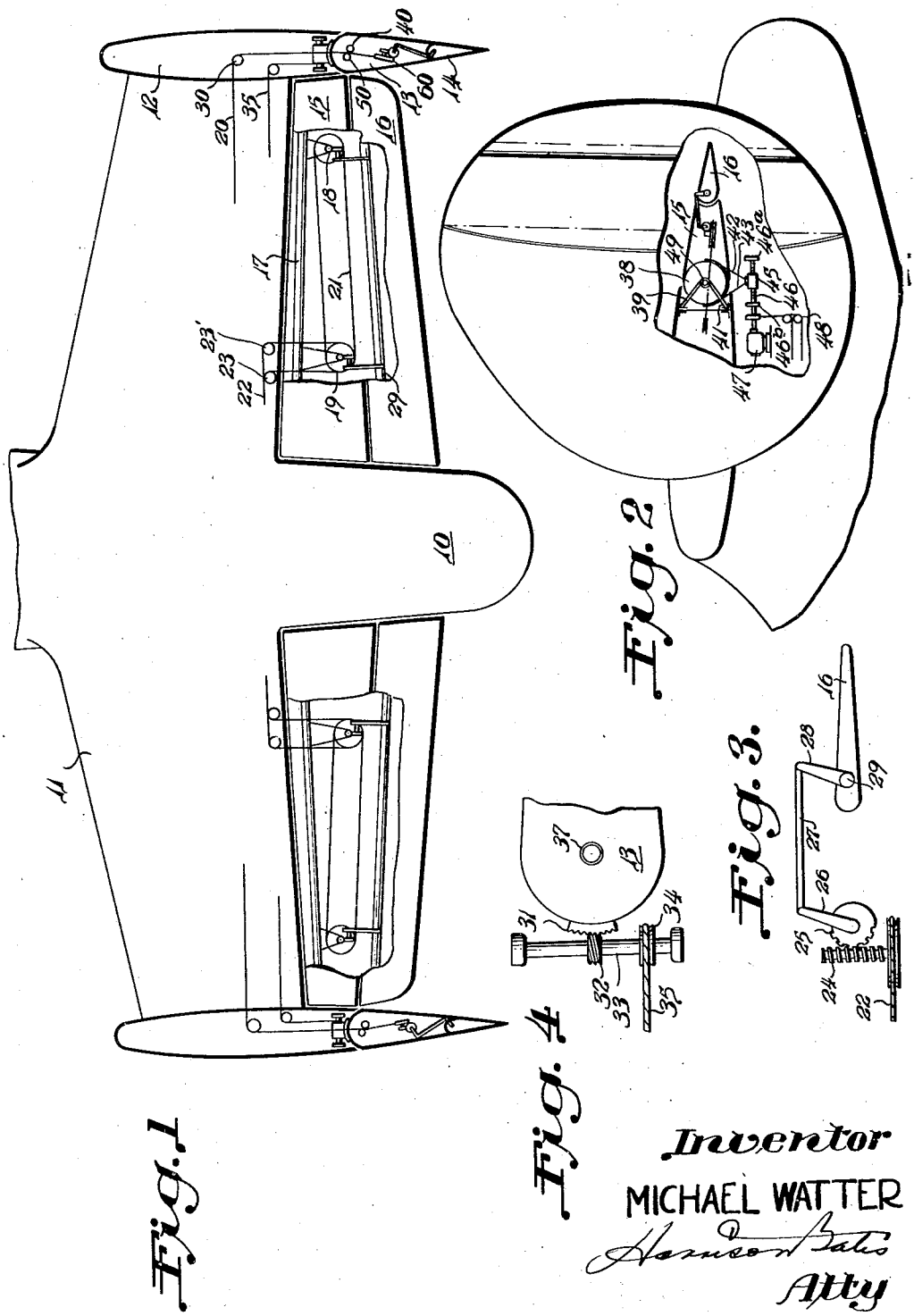
Inventor
MICHAEL WATTER
Harrison Bates
Atty May 16, 1939. M. WATTER 2,158,598
AIRCRAFT CONSTRUCTION
Filed Nov. 30, 1937 2 Sheets-Sheet 2
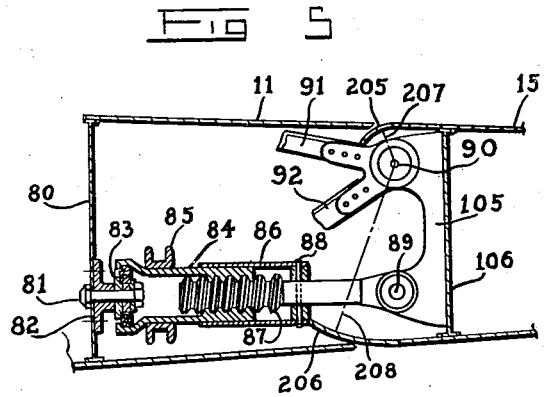
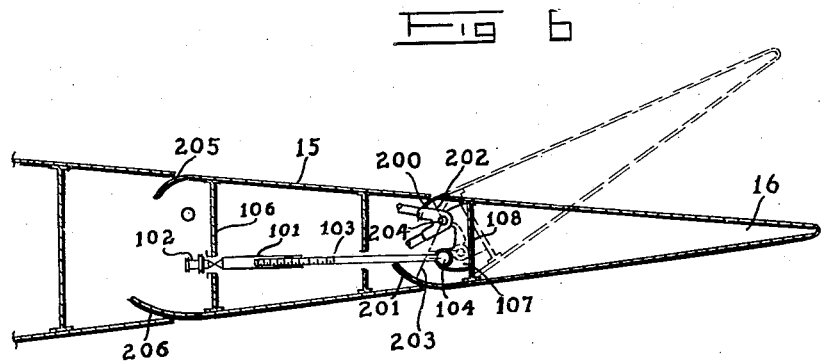
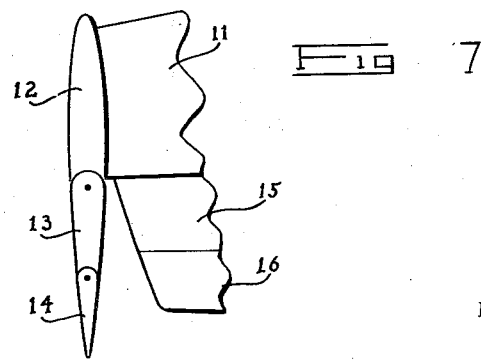
INVENTOR.
MICHAEL WATTER
BY
ATTORNEY.

Patented May 16, 1939

2,158,598

UNITED STATES PATENT OFFICE 2,158,598

AIRCRAFT CONSTRUCTION

Michael Watter, Baltimore, Md., assignor to The Glenn L. Martin Company, Baltimore, Md.

Application November 30, 1937, Serial No. 177,202

10 Claims. (Cl. 244—87)

This invention relates to aircraft and more particularly to a novel construction of trimming and control surfaces.

The present construction utilizes three hingedly connected airfoil sections; the first a stationary supporting surface, such as a stabilizer, fin, wing, etc.; the second, immediately aft, called the trimming surface; and the third a main control surface, such as that of a rudder, elevator, aileron, etc.

The trimming surface of this invention is preferably controlled by means of an irreversible mechanism, while the control surface may be moved by any suitable means; reversible, semi-irreversible, or completely irreversible, depending on the size of the airplane.

The present invention as disclosed is similar for both the horizontal and the vertical surfaces except that the horizontal surfaces as a whole, with all movable portions neutral, are set initially to trim the airplane at the speed at which the airplane will be operated the greatest part of the time; for instance, it may be set for high speed cruising, or if the plane is intended for long range operation, it will be set for an appropriate speed to give the maximum range. When the pilot desires to change the speed of flight for any prolonged time, he operates the trim setting device and sets the trimming surface in such a way that the plane is trimmed at the proper speed without any appreciable load on the column, which means that the control surface is set at a normal trailing angle. Any deviation from this speed for a short period of time or to correct for normal deviation of the plane due to gusts, the pilot operates his column, which causes the movement of the control portion as ordinarily employed in normal means of control.

Within the scope of the invention, it is possible to vary broadly the relative areas of the fixed and movable surfaces. For example, with respect to the horizontal stabilizing surface, the fixed surface may be from 50% to 70% of the total area of all of the surfaces. In the vertical surfaces the fixed surface may be as low as 40% or as high as 70% of the total area of all the surfaces. The movable trailing surfaces and the control surface may vary in areas, with the trailing surface preferably within a range of one to two times the area of the control surface. These variations will depend to some extent on the size and stability characteristics of the aircraft.

My invention provides a novel construction for utilizing the so-called camber variable device for the purpose of control, and the camber variation is obtained by a novel construction and arrangement of two movable surfaces. Normally in large airplanes suitable manual control necessitates an inset type of balance which is assisted for trimming purposes by incorporation of trimming tabs. It is known that the over-hang type balance presents a definite icing hazard as well as being inefficient, because of the loss of power due to leakage through the opening. The use of trimming tabs presents a further disadvantage inasmuch as the balancing action of tabs is directly opposite to the intended action of the tail as a whole, and hence results in the loss of the natural effective control and stabilizing force. These conditions are further aggravated commensurate with the increase in the size of the plane, and it becomes necessary to seek other means for control and stabilizing action.

Therefore, it is one object of this invention to provide a construction that shall overcome the above difficulties.

Another object of this invention is to provide improved trimming and control surfaces which shall be simple in construction, efficient in operation, and substantially free from vibration.

Another object is to provide a novel construction, wherein the control surfaces may be either operated simultaneously with or independently of the trimming surfaces.

Another object is to provide a novel construction wherein the camber variable device is used for the purpose of control, the camber variation being obtained by incorporation of two or more movable surfaces.

A further object is to provide novel mechanism for actuating, either mechanically or manually, the trimming and control surfaces, which will operate to render the same substantially without vibration.

A still further object is the provision of a novel structure to preclude icing hazards.

The above and other objects will be made apparent throughout the further description of the invention when taken in connection with the accompanying drawings, wherein like reference characters refer to like parts. It is to be distinctly understood that the drawings are not a definition of the invention but merely illustrate certain forms of the invention, by means of which the invention may be effectuated.

In the drawings,

Figure 1 is a top plan view, more or less diagrammatic and having a portion broken away for the purpose of illustrating detail construction, and showing an aircraft empennage embodying the invention, Figure 2 is a side elevational view of Figure 1 having a portion broken away for the purpose of illustrating certain details of construction, Figure 3 is an enlarged fragmentary view of a detail of the invention, Figure 4 is an enlarged detailed view, more or less diagrammatic, illustrating another detail of the invention, Figure 5 is a detailed view of another embodiment of the invention, showing means for actuating trimming surfaces, Figure 6 is a detailed view of another embodiment of the invention, illustrating means for actuating the control surfaces, and Figure 7 is a fragmentary top plan view of another embodiment of the invention.

Referring to the drawings, the mechanism is the same for the dual control surfaces and it is thought expedient to describe the present invention in connection with one set only.

As illustrated in Figure 1, 10 indicates the aft end of an aircraft body having a stabilizer 11 carried thereby and equidistantly extending laterally from the side thereof. Vertical stabilizer or fin 12 is positioned on the end of horizontal stabilizer 11 and has hingedly connected thereto at its trailing edge a trimming surface 13, which in turn hingedly carries at its trailing edge control surface 14. Trimming surface 15 of the elevator is hingedly connected to the trailing edge of stabilizer 11 and is confined by a recess formed by the body 10 and the fin 12, while control surface 16 is hingedly connected to the trailing edge of trimming surface 15 and is shielded at its ends by the aft end of the fuselage or body 10 and the corresponding vertical trimming surface 13.

Figure 7 illustrates another embodiment of the invention, wherein trimming surface 15 of the elevator is hingedly connected to the trailing edge of stabilizer 11 and control surface 16 is hingedly connected to the trailing edge of trimming surface 15, while trimming surface 13 is hingedly connected to the trailing edge of fin 12 and control surface 14 is hingedly connected to the trailing edge of trimming surface 13 in such a manner that trimming surface 15 is shielded at its ends by the body 10 and the corresponding trimming surface 13, and control surface 16 is shielded at its ends by the body 10 and the corresponding control surface 14.

Figure 1 illustrates, more or less diagrammatically, means for manipulating a control surface or elevator 16 and trimming and rudder surfaces 13 and 14, respectively. With reference to the elevator control surface 16, a shaft 17 located within the trimming surface 15 has attached thereto laterally disposed pulleys 18 and 19 which are connected by an endless cable 21. Pulley 19 is actuated by a cable 22 which engages pulleys 23 and 23' and like pulley 18 has erected perpendicularly thereon a worm 24 which engages a worm gear 25, as more clearly shown in Figure 3; wherein members 26 are rigidly connected to worm gears 25, members 27 are hingedly connected to members 26 and 28, and members 28 are rigidly connected to a shaft 29 of the control surface 16.

Therefore, by manipulating cable 22, which engages pulley 19, worm 24 revolves causing gear 25 to displace members 26, 27, and 28 and control surface 16.

Figure 2 shows irreversible means for maneuvering the trimming surface 15 wherein a member 38, fixedly mounted in the trimming surface 15 and supported by members 39 and 41, includes rigidly connected actuating arms 42 and 43 which converge and are pivotally connected to an internally threaded member 45, the latter being adapted to travel along a worm 46. Worm 46 is revolved either manually by a means 48, or mechanically by a motor 47, and is rigidly supported on or within the structure of the airplane at points 46a and 46b. Thus it will be seen that when worm 46 is revolved, either manually or mechanically, the internally threaded member 45 will move along worm 46 and cause member 38 to turn about its axis 49 due to the resultant longitudinal movement of members 43 and 42.

From the above description, it can be seen that control surface 16 may be efficiently operated simultaneously with or independently of trimming surface 15.

With reference to the vertically disposed trimming surface, as more clearly shown in Figure 4, the trimming surface 13 has connected rigidly thereto an arcuate-shaped gear 31, which engages a worm 32, the latter being made integral with a trunnion 33. Trunnion 33 has fixedly mounted thereto a pulley 34 which is actuated by a cable 35. Hence, it will be seen that by maneuvering cable 35, pulley 34 will revolve trunnion 33 and worm 32 and cause the displacement of trimming surface 13 about its axis 37.

A rudder control surface 14 as shown in Figure 1 is operated through the medium of an actuating cable 20 which is passed around pulleys 30, through cooperating pulleys 40 and 50 and then around a pulley 60. The operating mechanism is substantially the same as that described in connection with Figure 3.

From the above description, it will likewise be seen that control surface 14 may be efficiently operated simultaneously with or independently of trimming surface 13.

Figure 5 shows another embodiment of the invention for actuating the trimming surface 15, wherein spar 80 of the stabilizer 11 has rigidly connected thereto by means 81 a flanged member 82 which in turn supports in a race 83 an internally threaded member 84. Member 84 is rigidly encircled by a pulley 85 and receives in sliding telescopic relation sealing member 86, which is made fast to a worm member 87 by means 88. One end of worm member 87 engages the internal threads of member 84, while the other end hingedly connects to trimming surface 15 at point 89 on a member 105 which is attached to a spar 106 of the trimming surface 15. Trimming surface 15 is pivotally supported on a shaft 90, the latter being supported by arms 91 and 92 which are attached to spar 80 of the stabilizer 11.

Race 83 is constructed (as shown in Figure 5) to take care of the slight vertical displacement of member 84 and worm 87 when the trimming surface is actuated.

Therefore, when pulley 85 is revolved (by means not shown) thereby revolving member 84, worm 87 is moved along the internal threads of member 84 thereby causing trimming surface 15 to move about its axis 90.

Figure 6 shows another form of a control mechanism for actuating control surface 16, wherein spar 106 of trimming surface 15 has pivotally attached thereto a member 101, one end of which carries a pulley 102, while the other end is internally threaded to receive externally threaded member 103, which is hingedly connected to control surface 16 at point 104 on a member 107, which in turn is attached to a member or spar 108 of control surface 16. The remainder of the construction and the method of operation is the same as that described in connection with Figure 5. Member 101 is likewise attached to member 106 in such a way as to allow for the vertical displacement of members 101 and 103 when the control surface is actuated.

The leading edges of all of the trimming surfaces are so shaped that they will not protrude from or over-hang the stabilizers or fins when the trimming surfaces are moved about their axes. Also, the leading edges of all of the control surfaces are similarly shaped so they will not protrude or over-hang the trimming surfaces when the control surfaces are moved about their axes; for as above mentioned, it has been found that the over-hanging type balance presents an icing hazard as well as being inefficient because of the loss of power due to leakage through the opening between the relative movable surfaces.

This feature is best illustrated in Figure 6, wherein the leading edge surfaces 200 and 201 of control surface 16 present arcuate contours which, when displaced about their common axis 204, describe arcs by their radii 202 and 203, respectively, which will not protrude or overhang the adjacent trimming surface 15. Also, in Figure 5, the leading edge surfaces 205 and 206 of trimming surface 15 present similar contours to those above described, which, when displaced about their common axis 90, describe arcs by their radii 207 and 208 which will not protrude or over-hang the adjacent stabilizer surface 11.

Some of the important features of the invention reside in the incorporation of irreversible and semi-irreversible control means thereby dispensing with mass balancing and yet assuring the system from flutter and vibration; the absence of over-hanging balance to preclude icing hazards; the fact that the trimming action need not be instantaneous, thus enabling large surfaces to be moved manually without undue effort on the part of the pilot, while the use of a narrow chord control surface provides ample control with small load required on the control column.

While I have illustrated and described the present invention in connection with an airplane empennage, it is to be distinctly understood that the teachings of the present invention may be employed wherever such an operation is required.

Also various changes, modifications, additions, substitutions, and omissions may be made in the specific construction and arrangement of parts without departing from the spirit and scope of the appended claims.

I claim:

1. In an aircraft having a sustaining surface, a tail construction spaced behind and separate from the sustaining surface, and a fuselage connecting said tail construction to said sustaining surface, said tail construction including a fixed stabilizing surface, a movable trim surface and a movable control surface, the said trim surface and control surface being located rearwardly of the said stabilizing surface and the said trim surface being positioned intermediately of the said control surface and the said stabilizing surface.

2. In a device as claimed in claim 1, the cross-sectional area of the said trim surface being greater than the corresponding cross-sectional area of the said control surface.

3. In a device as claimed in claim 1, the area of the trim surface in plan being greater than the area of the said control surface in plan.

4. In an aircraft having a sustaining surface, a tail construction spaced behind and separate from the sustaining surface, and a fuselage connecting said tail construction to said sustaining surface, said tail construction including a fixed surface having a trailing edge, a trim surface positioned adjacent the said trailing edge and movable relative thereto, a control surface positioned rearwardly of the said trim surface, the said control surface being movable relative to the said fixed surface independently of the said trim surface.

5. A device as claimed in claim 4, wherein a separate means is provided for moving the said trim surface and the said control surface relative to the said fixed surface.

6. A device as claimed in claim 4, wherein a separate means is provided for moving the said trim surface and the said control surface relative to the said fixed surface, one of the said means including an irreversible means.

7. A device as claimed in claim 4, wherein a separate means is provided for moving the said trim surface and the said control surface relative to the said fixed surface, one of the said means being a manually operated means and the other of the said means being a power operated means.

8. In an aircraft having a sustaining surface, a tail construction spaced behind and separate from the sustaining surface, and a fuselage connecting said tail construction to said sustaining surface, said tail construction including a pair of fixed surfaces, the surfaces being disposed in planes at right angles one to the other, each of the said surfaces having a trailing edge, a trim surface carried by each of the said surfaces and adjacent their respective trailing edges, a control surface disposed rearwardly of each of the said trim surfaces and means for moving the said control surfaces relative to their corresponding fixed surfaces.

9. A device as claimed in claim 8, wherein each of the said trim surfaces and the said control surfaces are provided with separate actuating means.

10. A device as claimed in claim 8, wherein one of the said pair of surfaces including its cooperating trim surface and control surface is positioned in end shielding relation with the other of said pair of surfaces including its cooperating trim surface and control surface.

MICHAEL WATTER.